(12) United States Patent
Musiolik

(10) Patent No.: US 11,784,606 B2
(45) Date of Patent: Oct. 10, 2023

(54) METHOD AND DEVICE FOR A FAILSAFE ROTATIONAL SPEED MONITORING PROCESS

(71) Applicant: KEB AUTOMATION KG, Barntrup (DE)

(72) Inventor: Stephan Musiolik, Detmold (DE)

(73) Assignee: KEB AUTOMATION KG, Barntrup (DE)

( * ) Notice: Subject to any disclaimer, the term of this patent is extended or adjusted under 35 U.S.C. 154(b) by 0 days.

(21) Appl. No.: 17/296,120

(22) PCT Filed: Nov. 25, 2019

(86) PCT No.: PCT/EP2019/082444
§ 371 (c)(1),
(2) Date: May 21, 2021

(87) PCT Pub. No.: WO2020/109240
PCT Pub. Date: Jun. 4, 2020

(65) Prior Publication Data
US 2022/0014141 A1 Jan. 13, 2022

(30) Foreign Application Priority Data
Nov. 26, 2018 (EP) ...................................... 18208372

(51) Int. Cl.
*H02P 29/10* (2016.01)

(52) U.S. Cl.
CPC .................... *H02P 29/10* (2016.02)

(58) Field of Classification Search
CPC ....... H02H 7/0844; H02P 23/12; H02P 29/02; H02P 29/10
See application file for complete search history.

(56) References Cited

U.S. PATENT DOCUMENTS 6,018,225 A * 1/2000 Garces .................... H02P 6/182
318/798
2002/0063548 A1 5/2002 Schwesig
(Continued)

FOREIGN PATENT DOCUMENTS

DE 102005010854 A1 * 9/2006 .............. H02P 27/06
DE 102005010854 A1 9/2006
(Continued)

*Primary Examiner* — Said Bouziane
(74) *Attorney, Agent, or Firm* — Harness, Dickey & Pierce, P.L.C.

(57) ABSTRACT

A method for fail-safe rotational speed monitoring of a sensorless three-phase drive, in which the three-phase drive is controlled in three phases with the phases U, V, W by drive electronics comprising an inverter, with the voltage signals at the three phases U, V, W being present as pulse width modulated signals, in which an output frequency of the inverter applied to the drive is determined and an actual rotational speed of the drive is determined therefrom, in which the actual rotational speed is compared with a pre-determinable desired rotational speed and in which, if the actual rotational speed exceeds the desired rotational speed, the drive is switched off, the pulse width of the pulse width modulated signals being used to determine the output frequency of the inverter.

8 Claims, 2 Drawing Sheets

(56) References Cited

U.S. PATENT DOCUMENTS

| | | | | |
|---|---|---|---|---|
| 2011/0084642 A1* | 4/2011 | Ams | ................... | H02H 7/0844 |
| | | | | 318/490 |
| 2011/0084643 A1 | 4/2011 | Ams | | |
| 2013/0229845 A1* | 9/2013 | Kim | ................... | H02P 23/0086 |
| | | | | 363/165 |

FOREIGN PATENT DOCUMENTS

| | | |
|---|---|---|
| DE | 102009048944 A1 | 4/2011 |
| DE | 102011009927 A1 | 8/2012 |
| EP | 1211774 A1 | 6/2002 |
| JP | H08205303 A | 8/1996 |

\* cited by examiner

METHOD AND DEVICE FOR A FAILSAFE ROTATIONAL SPEED MONITORING PROCESS

CROSS-REFERENCE TO RELATED APPLICATIONS

This application is a U.S. National Phase Application under 35 U.S.C. 371 of International Application No. PCT/EP2019/082444, filed on Nov. 25, 2019, which claims the benefit of European Patent Application No. 18208372.5, filed on Nov. 26, 2018. The entire disclosures of the above applications are incorporated herein by reference.

FIELD

The disclosure relates to a method for fail-safe rotational speed monitoring of a sensorless three-phase drive, in which the three-phase drive is controlled in three phases with the phases U, V, W by drive electronics comprising an inverter, with the voltage signals at the three phases U, V, W being present as pulse width modulated signals. The disclosure also relates to a device for fail-safe rotational speed monitoring of a sensorless three-phase drive, in particular for carrying out the method according to the disclosure.

BACKGROUND

This section provides background information related to the present disclosure which is not necessarily prior art.

Three-phase drives of this type are used in industrial applications to drive machine tools, robots, conveyor belts and/or the like. They present a potential risk, in particular for operators, which is why appropriate protection is required. Possible measures to protect especially electrical power drives are standardized in EN 61800-5-2 "Electrical power drive systems with adjustable rotational speed; Part 5-2; Requirements for safety—functional safety".

One of the standardized safety functions concerns the so-called safe maximum speed (SLS—Safely Limited Speed). According to this safety function, it is monitored that a predeterminable maximum speed, i.e. rotational speed, is not exceeded on the drive side. For this purpose, the rotational speed of the drive is monitored and an error reaction is triggered if a predeterminable limit speed is exceeded. A possible error reaction is the immediate interruption of the power supply to the drive, which is then stopped uncontrolled (STO—Safe Torque Off).

In order to implement among others the SLS safety function according to standards, it is known from prior art to use external sensors, for example for rotational speed determination. Such sensors, in turn, must comply with corresponding safety standards, such as EN 61508.

The use of an external sensor system for measuring the rotational speed of a drive has proven itself in everyday practical use, but there are also disadvantages. On the one hand, the use of external sensor systems is costly and therefore inherently disadvantageous, not least because it requires additional compliance with safety standards with regard to such external sensor systems. On the other hand, in order to comply with relevant standards such as EN 61800-5-2, it may be necessary to use sensor systems that operate redundantly, which also leads to higher costs and also to higher installation costs.

In order to counter the aforementioned disadvantages, it is known from DE 10 2009 048 944 A1 to determine the load speed of a motor on the basis of current and voltage curves, as they are transmitted from the drive electronics to the motor. For this purpose, it is provided that the load speed is determined by calculating an observer model on the basis of the detected current, the detected voltage, the frequency predetermined by the driving and the characteristic map data of the motor.

The solution known from DE 10 2009 048 944 A1 does not require external sensors, but for a standard-compliant, two-channel current and/or voltage detection it is necessary to provide a correspondingly redundantly-operating measuring device which is complex and therefore expensive. With regard to current measurement, it must also be taken into account that there are motor-side operating points or load cases in which the current is zero. In these cases, a rotational speed on the drive side cannot be determined, so that functional safety is not ensured in these cases. This is particularly the case with so-called servomotors and synchronous reluctance motors, which is why these motors are generally excluded from the SLS safety function.

From prior art according to EP 1 211 774 A1, safe speed monitoring for sensorless three-phase drives is also known in which a two-channel switch-off occurs when a fault is detected. For this purpose it is provided that in two almost redundant systems a determined stator frequency setpoint is limited and monitored in two channels, and in each system respective control set signals for the current valves of the inverter are derived from this, which can be compared with each other in two monitoring electronics. Due to the redundant system design, this configuration also turns out to be costly and time-consuming to implement.

SUMMARY

This section provides a general summary of the disclosure, and is not a comprehensive disclosure of its full scope or all of its features.

Based on the above, it is an object of the disclosure to provide a method for fail-safe rotational speed monitoring of a sensorless three-phase drive which can be implemented more easily compared to prior art, while simultaneously complying with the standardized safety functions. The disclosure is also intended to provide a corresponding device for carrying out the method.

In order to achieve the above object, a method for fail-safe rotational speed monitoring of a sensorless three-phase drive is provided in which the three-phase drive is controlled in three phases with the phases U, V, W by drive electronics comprising an inverter, wherein the voltage signals at the three phases U, V, W are present as pulse width modulated signals, in which an output frequency of the inverter applied to the drive is determined and an actual rotational speed of the drive is determined therefrom, in which the actual rotational speed is compared with a predeterminable desired rotational speed and in which, if the actual rotational speed exceeds the desired rotational speed, the drive is switched off, exclusively the pulse width of the pulse width modulated signals being used to determine the output frequency of the inverter.

On the device side, in order to achieve the object, a device for fail-safe rotational speed monitoring of a sensorless three-phase drive is provided, in particular for carrying out the above method, the device comprising drive electronics including an inverter and by means of which the three-phase drive can be controlled in three phases with the phases U, V, W, a pulse width modulation generator by means of which current and voltage signals can be provided at the three phases U, V, W as pulse width modulated signals, means for determining an output frequency of the inverter which is applied to the drive, a calculation unit for determining the actual rotational speed of the drive on the basis of the output frequency of the inverter, a comparison unit and a switch-off device, the actual rotational speed being comparable with a predeterminable desired rotational speed by means of the comparison unit, the comparison unit generating a corresponding signal in the event of the actual rotational speed exceeding the desired rotational speed and transmitting it to the switch-off device by means of which the drive can be switched off, and the device comprising means for detecting the pulse widths of the pulse width modulated signals, a determination of the output frequency of the inverter applied to the drive being possible exclusively on the basis of the pulse widths.

In accordance with the disclosure, it is provided to determine the output frequency of the inverter applied to the drive during use as intended and to determine the actual rotational speed of the drive on the basis of this output frequency. Only the pulse width of the pulse width modulated signals is used to determine the output frequency. In contrast to prior art, neither current nor voltage is measured to determine the rotational speed. This not only simplifies carrying out the method and also the structure of the device, but also provides an extended range of applications, as the particular advantage of pulse width determination is that it does not have to exclude complete motor types from the SLS safety function. In particular, servomotors and synchronous reluctance motors can also be safely operated using the method according to the disclosure or the device according to the disclosure. With regard to these motor types, only a few operating points are to be excluded, but not these motor types as such, as is the case with a current measurement that must necessarily be provided according to prior art.

The clue of the disclosure lies in the fact that, contrary to expectations, it is not decisive to record the current and/or voltage curves as they are transferred to the three-phase drive. The disclosure makes use of the fact that the inverter-side output voltage can be determined on the basis of the intermediate circuit voltage of a frequency converter providing the inverter, wherein the intermediate circuit voltage is included in the determination of the phase-element voltages in a fixed ratio, which makes a concrete measurement of both the output voltage and the intermediate circuit voltage superfluous. As a result of the design according to the disclosure, the output frequency and thus also the rotational speed are determined solely on the basis of the pulse widths of the pulse width modulated signals. The pulse width for controlling for example the IGBTs of the phases U+, V+ and W+ can be determined in particular by means of a gate with the same resolution as the pulse width modulation generator.

Since pulse width modulation is provided anyway, a reliable rotational speed determination can be achieved in a simple way and without additional hardware equipment by means of the method or device according to the disclosure. This means that neither external sensor systems nor additional measuring devices for current and/or voltage measurement are required.

The design according to the disclosure therefore provides to determine the rotational speed of a drive during use as intended. The determined rotational speed is compared as the actual rotational speed with a predeterminable desired rotational speed. If the actual speed is above the desired speed, i.e. if a predeterminable limit speed is exceeded during actual operation of the drive, the drive is switched off immediately.

The speed of the drive is calculated on the basis of the output frequency on the inverter side applied to the drive. In turn, the output frequency is determined using the pulse widths of the pulse width modulated signals. This is possible by means of a gate with the same resolution as the PWM generator, which results in a method that can be carried out very simply.

In accordance with a further feature of the disclosure, the pulse widths determined are used to determine a transformation angle. To determine a transformation angle, the ratio of the transformed pulse widths in the stator-fixed coordinate system is used, as shown in the following formulas.

Thus the switching frequency $CNT_{FSWITCH}$ can be determined by means of the pulse width of the three phases $$CNT_{FSWITCH} = 2\frac{p_U + p_V + p_W}{3} \text{ or}$$

$$CNT_{FSWITCH} = \text{Max}(p_U; p_V; p_W) + \text{Min}(p_U; p_V; p_W) + 2\ TOTKOMP$$

The pulse width must be adjusted for the dead time compensation $CNT_{TOTKOMP}$. The phase-element voltage is then obtained with the switching frequency $CNT_{FSWITCH}$ and the intermediate circuit voltage $U_{IC}$ as follows:

$$\begin{bmatrix} u_U \\ u_V \\ u_W \end{bmatrix} = \frac{u_{IC}}{CNT_{FSWITCH}} \begin{bmatrix} p_U - CNT_{TOTKOMP\,U} \\ p_V - CNT_{TOTKOMP\,V} \\ p_W - CNT_{TOTKOMP\,W} \end{bmatrix}$$

Transformed into an α/β coordinate system, the resulting phase-element voltages are:

$$\begin{bmatrix} u_\alpha \\ u_\beta \end{bmatrix} = \begin{bmatrix} \frac{2}{3} & -\frac{1}{3} & -\frac{1}{3} \\ 0 & \frac{1}{\sqrt{3}} & -\frac{1}{\sqrt{3}} \end{bmatrix} \cdot \begin{bmatrix} u_U \\ u_V \\ u_W \end{bmatrix}$$

with the transformation angle resulting from the transformed voltages in the stator-fixed coordinate system then being $$\varphi = \arctan\left(\frac{u_\beta}{u_\alpha}\right)$$

Since, according to the above formula, only the ratio of the voltages is important for determining the transformation angle, the control degrees can be used directly for the calculation, so that a determination of the intermediate circuit voltage, i.e. a measurement of the intermediate circuit voltage, is not required. The result is as follows:

$$\begin{bmatrix} p_\alpha \\ p_\beta \end{bmatrix} = \begin{bmatrix} \frac{2}{3} & -\frac{1}{3} & -\frac{1}{3} \\ 0 & \frac{1}{\sqrt{3}} & -\frac{1}{\sqrt{3}} \end{bmatrix} \cdot \begin{bmatrix} p_U - CNT_{TOTKOMP\,U} \\ p_V - CNT_{TOTKOMP\,V} \\ p_W - CNT_{TOTKOMP\,W} \end{bmatrix}$$

so that the resulting transformation angle is $$\varphi = \arctan\left(\frac{p_\beta}{p_\alpha}\right)$$

where $P_{U,V,W}$ the pulse width of the PWM signals for controlling the inverter valves $u_{U,V,W}$ instantaneous values of the phase voltages related to the virtual star point $u_{IC}$ instantaneous value of the intermediate circuit voltage φ rotor position (transformation angle).

An angle difference then results in the output frequency $$\omega_1 = \frac{\Delta \varphi}{\Delta t} = (\varphi_{(k)} - \varphi_{(k-1)}) \cdot f_{CALC}$$

where

φ rotor position (transformation angle)

$\omega_1$ output electrical angular frequency $$\left[\frac{rad}{s}\right]$$

$f_{CALC}$ frequency of calculation.

Based on the electrical angular frequency determined in this way, the mechanical speed ω in $$\left[\frac{rad}{s}\right]$$

of the three-phase drive can then be determined, as will be shown in more detail below.

According to another feature of the disclosure it is provided that the output frequency is determined in two channels, namely by means of a first microcontroller on the one hand and, depending on this, by means of a second microcontroller on the other. The redundant determination of the output frequency serves the standardized compliance with increased safety requirements.

It is also preferable in this context that the output frequencies determined by the two microcontrollers are exchanged and compared via cross-communication between the two microcontrollers. If the result of this comparison is an inequality, the drive is switched off immediately.

According to the disclosure, a distinction must therefore be made between two switch-off scenarios. According to a first scenario, the drive is switched off immediately if the two microcontrollers provided according to the disclosure detect output frequencies which are different from each other. Determining the actual rotational speed of the drive is therefore no longer important. The drive is already switched off because the microcontrollers determine different output frequencies. A standardized tolerance range can be provided, according to which a deviation between the output frequencies determined by the microcontrollers is permitted within certain, possibly predeterminable limits.

If the output frequencies determined by the microcontrollers are of the same size within the predeterminable tolerance range, the actual rotational speed of the drive is determined on the basis of this determination. If the actual rotational speed exceeds a predeterminable desired rotational speed, the drive is switched off because in this case the actual rotational speed of the drive is too high, i.e. inadmissibly high. The drive is therefore not switched off if the actual rotational speed is below the desired rotational speed. A tolerance range may also be provided for the comparison between the actual rotational speed and the desired rotational speed.

The actual rotational speed of the drive can be determined in a manner known per se on the basis of the output electrical angular frequency $w\omega_1$. To determine the mechanical speed, a distinction must be made between different drive types.

For an asynchronous drive the result is for example $$\omega = \frac{\omega_1}{p} \cdot (1 - s)$$

where $\omega_1$ output electrical angular frequency $$\left[\frac{rad}{s}\right]$$

ω mechanical speed $$\left[\frac{rad}{s}\right]$$

s slippage.

For a synchronous drive, however, the result is as follows:

$$\omega = \frac{\omega_1}{p}$$

where $\omega_1$ output electrical angular frequency $$\left[\frac{rad}{s}\right]$$

ω mechanical speed $$\left[\frac{rad}{s}\right]$$

With the disclosure, the advantage is achieved both on the process side and on the device side that a reliable determination of the rotational speed is possible in accordance with the standard, and in contrast to prior art neither a current measurement nor a voltage measurement takes place. The reliable determination of the rotational speed is carried out solely on the basis of the level of modulation of the PWM signals. This not only enables a simplified process and device design, it also makes it possible to subject drive types previously excluded from the SLS safety function, such as servo motors and synchronous reluctance motors, to safe speed determination.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further features and advantages of the disclosure will become apparent from the following description on the basis of the drawing figures.

Corresponding reference numerals indicate corresponding parts throughout the several views of the drawings.

DETAILED DESCRIPTION

Example embodiments will now be described more fully with reference to the accompanying drawings.

Figure 1:
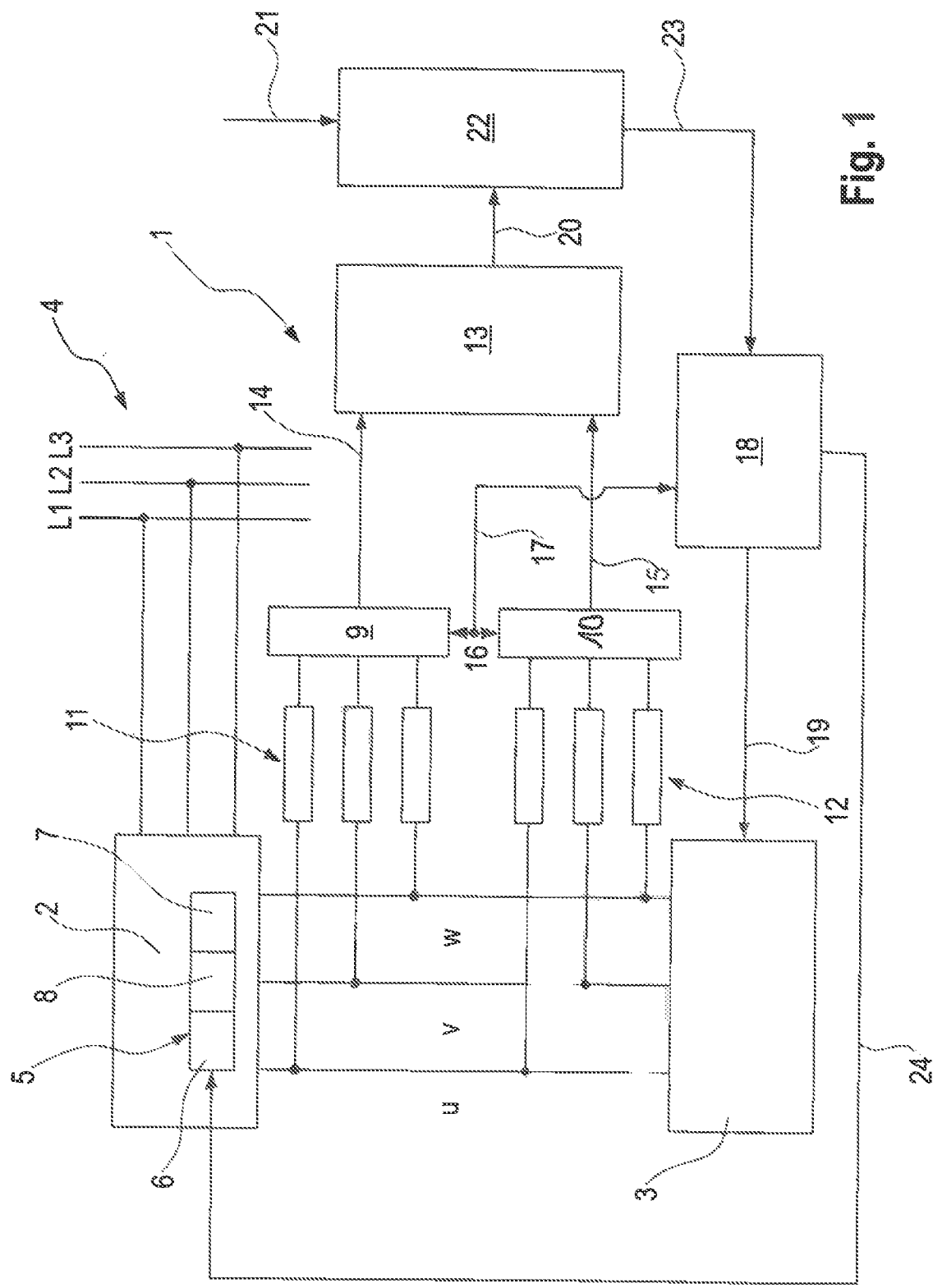
FIG. 1 shows a schematic circuit diagram of the device or method in accordance with the disclosure.

FIG. 1 shows in a schematic circuit diagram the device 1 for fail-safe rotational speed monitoring of a sensorless three-phase drive 3 in accordance with the disclosure.

The three-phase drive 3 is controlled three-phase by drive electronics 2, namely with the motor phases U, V, W. The drive electronics 2 in turn is supplied by a three-phase supply line 4 with the phases L1, L2 and L3.

To control the three-phase drive 3, which is an electric motor in the form of an asynchronous motor, for example, the drive electronics 2 has a frequency converter 5, and the voltage signals at the three motor phases U, V, W are present as pulse width modulated signals.

In a manner known per se, the frequency converter 5 has a rectifier 6 and an inverter 7, which are interconnected by means of an intermediate circuit 8.

The device 1 according to the disclosure has two redundantly arranged microcontrollers 9 and 10, by means of which the inverter-side output frequency is determined in two channels. A first channel 11 and a second channel 12 are provided for this purpose, with the microcontroller 9 connected to the first channel 11 and the microcontroller 10 to the second channel 12. The two microcontrollers 9 and 10 are interconnected via cross communication 16.

During use as intended, the output frequency of the inverter 7 applied to the three-phase drive 3 is determined on the method side. The pulse width of the pulse width modulated signals is used to determine the output frequency.

The output frequencies determined by the two microcontrollers 9 and 10 are compared with each other via cross communication 16. In the event of an inequality, drive 3 is switched off immediately, for which purpose a switch-off device 18 is provided. This communicates with the drive 3 in accordance with arrow 19. Alternatively and also preferably, a communication connection between the switch-off device 19 and the frequency inverter 5 is provided in accordance with arrow 24. As soon as an unequal output frequency is detected, a signal is transmitted to the switch-off device 18 in accordance with arrow 17, which then ensures an immediate switch-off of the drive 3 either directly via the communication connection 19 or indirectly via the communication connection 24 by interposing the frequency inverter 5. The drive 3 is preferably switched off by actuating an appropriate switching device, for example by disconnecting the frequency converter 5 from the mains supply.

If the output frequencies determined redundantly by the microcontrollers 9 and 10 are the same, an actual rotational speed 20 of the drive 3 is determined on this basis. For this purpose, the device 1 according to the disclosure has a calculation unit 13 which is in communication connection with the microcontrollers 9 and 10 in accordance with arrows 14 and 15.

The actual rotational speed 20 determined by the calculation unit 13 is compared with a predeterminable desired rotational speed 21. For this purpose, the device according to the disclosure has a comparison device 22. If the actual rotational speed 20 exceeds the desired rotational speed 21, the drive 3 is switched off immediately, for which purpose the comparison device 20 is in communication connection with the switch-off device 18 in accordance with arrow 23.

The two microcontrollers 9 and 10 determine the output frequency on the basis of an angular difference as follows:

$$\omega_1 = \frac{\Delta \varphi}{\Delta t} = (\varphi_{(k)} - \varphi_{(k-1)}) \cdot f_{CALC}$$

where the rotor position, i.e. transformation angle φ, results as follows:

$$\varphi = \arctan\left(\frac{p_\beta}{p_\alpha}\right)$$

where $$\begin{bmatrix} p_\alpha \\ p_\beta \end{bmatrix} = \begin{bmatrix} \frac{2}{3} & -\frac{1}{3} & -\frac{1}{3} \\ 0 & \frac{1}{\sqrt{3}} & -\frac{1}{\sqrt{3}} \end{bmatrix} \cdot \begin{bmatrix} p_U - CNT_{TOTKOMP\,U} \\ p_V - CNT_{TOTKOMP\,V} \\ p_W - CNT_{TOTKOMP\,W} \end{bmatrix}$$

where
$P_{U,V,W}$ pulse width of the PWM signals for controlling the inverter valves
φ rotor position (transformation angle)
$\omega_1$ output electrical angular frequency $$\left[\frac{rad}{s}\right]$$

$f_{CALC}$ frequency of calculation.

As can be seen from the above illustration, the output frequency can be determined directly on the basis of the level of modulation of the PWM signals using the method according to the disclosure. Neither the output current nor the output voltage nor the intermediate circuit voltage need to be measured.

The schematic representation according to FIG. 1 is for explanation purposes only and is purely exemplary. In particular, it is possible to combine the calculation unit 13, the comparison device 22, the switch-off device 18 and the microcontrollers 9 and 10 to a common device. It can also be provided that the microcontrollers 9 and 10 each take over redundantly the functions of the calculation unit 13, the switch-off device 18 and/or the comparison device 22. Of disclosure-essential importance, however, is solely that a reliable determination of the rotational speed is effected solely on the basis of the control degree of the PWM signals, a two-channel determination being implemented which detects inequalities in cross-communication, wherein in the event of a detected inequality, the drive 3 is switched off immediately. In addition, drive 3 is switched off if the determined actual rotational speed is above a predeterminable desired rotational speed. Tolerance ranges, which must be defined in conformity with the standard, can be provided for the detection of inequalities and/or overspeeds.

Figure 2:
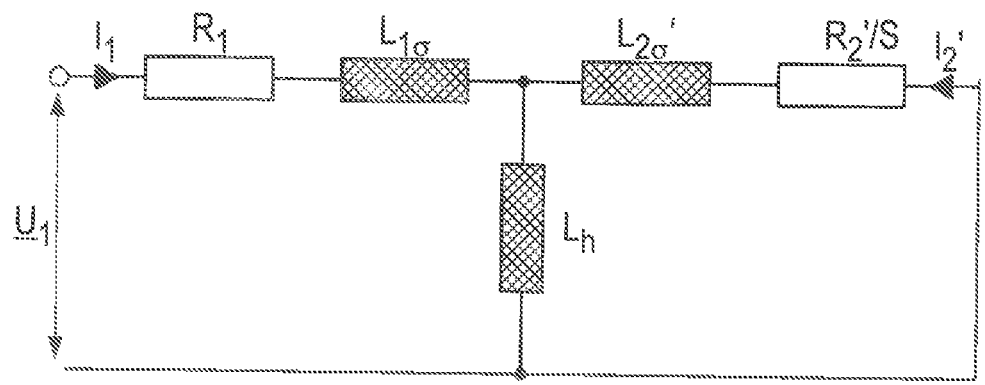
FIG. 2 shows an equivalent circuit diagram of an asynchronous drive.

FIG. 2 shows the equivalent circuit diagram of an asynchronous drive. For such a drive the actual rotational speed 21 results as follows:

$$\omega = \frac{\omega_1}{p} \cdot (1-s)$$

with $$X_{1\sigma} = \omega_1 L_{1\sigma} \text{ and } X'_{2\sigma} = \omega_1 L'_{2\sigma} \text{ and } X_h = \omega_1 L_h$$

where $$Z_{1Re} = \frac{u_{1\alpha}i_{1\alpha} + u_{1\beta}i_{1\beta}}{i_{1\alpha}^2 + i_{1\beta}^2}$$

$$Z_{1Im} = \frac{u_{1\beta}i_{1\alpha} - u_{1\alpha}i_{1\beta}}{i_{1\alpha}^2 + i_{1\beta}^2}$$

and $$\left(\frac{R'_2}{s}\right)^2 + (X'_{2\sigma} + X_h)^2 = -X_h^2 \frac{(X'_{2\sigma} + X_h)}{Z_{1Im} - (X_{1\sigma} + X_h)}$$

$$Z_{1Re} = R_1 - \frac{\frac{R'_2}{s}}{(X'_{2\sigma} + X_h)}[Z_{1Im} - (X_{1\sigma} + X_h)]$$

$$s = \frac{R'_2}{X'_{2\sigma} + X_h} \frac{X_{1\sigma} + X_h - Z_{1Im}}{Z_{1Re} - R_1}$$

where
$R_1$ stator resistance
$R_2'$ rotor resistance
$L_{1\sigma}'$ stator leakage inductance
$L_{2\sigma}'$ rotor leakage inductance
$L_h$ main inductance
s slippage.

Figure 3:
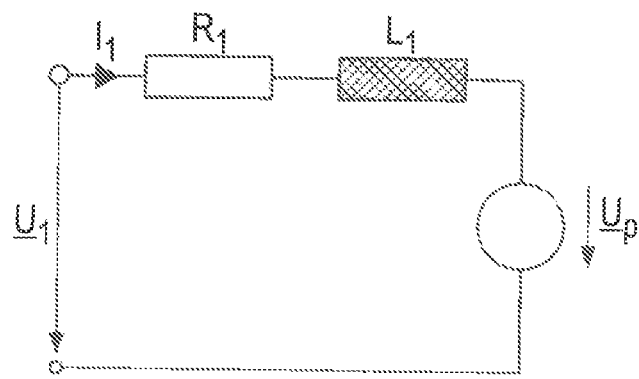
FIG. 3 shows an equivalent circuit diagram of a synchronous drive.

FIG. 3 shows the equivalent circuit diagram of a synchronous drive. In this respect the following applies:

$$\underline{U_2} = \underline{U_P} + \underline{I_1}(R_1 + jX_1)$$

$$\underline{U_P} = \omega \cdot \Psi_P$$

where the speed results as follows:

$$\omega = \frac{\omega_1}{p}$$

where
$\Psi_P$ rotor flux
$R_1$ stator resistance
$L_{1d}$ Stator inductance in d-direction
$L_{1d}$ Stator inductance in q-direction.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A method for fail-safe rotational speed monitoring of a sensorless three-phase drive, in which the three-phase drive is controlled in three phases with the phases U, V, W by drive electronics comprising an inverter, with the voltage signals at the three phases U, V, W being present as pulse width modulated signals, in which an output frequency of the inverter applied to the drive is determined and an actual rotational speed of the drive is determined therefrom, in which the actual rotational speed is compared with a predeterminable desired rotational speed and in which, if the actual rotational speed exceeds the desired rotational speed, the drive is switched off, wherein the output frequency is determined in two channels and the pulse width of the pulse width modulated signals only being used to determine the output frequency of the inverter in a first channel,
wherein the output frequency in the first channel is determined by a first microcontroller, and independently thereof, in a second channel by a second microcontroller, wherein for the determination of the output frequency of the inverter in the second channel, only the pulse width of the pulse width modulated signals is used, and
wherein the first and second channels do not include any voltage measurement and the first and second channels do not include any current measurement.

2. The method according to claim 1, wherein the pulse widths are used to determine a transformation angle.

3. The method according to claim 2, wherein the ratio from the transformed pulse widths in the stator-fixed coordinate system is used to determine a transformation angle.

4. The method according to claim 1, wherein a transformation angle difference is used to determine an output frequency.

5. The method according to claim 1, wherein the pulse widths are adjusted for a dead time compensation.

6. The method according to claim 1, wherein the output frequencies determined by the two microcontrollers are exchanged and compared via cross-communication between the two microcontrollers.

7. The method according to claim 1, wherein the drive is switched off if the output frequencies are unequal.

8. A device for fail-safe rotational speed monitoring of a sensorless three-phase drive, the device comprising
drive electronics having an inverter configured to control the three-phase drive in three phases with the phases U, V, W,
a pulse width modulation generator configured to provide voltage signals as pulse width modulated signals at the three phases,
first means to determine in two channels an output frequency of the inverter applied to the drive,
a calculation unit configured to determine the actual rotational speed of the drive on the basis of the output frequency of the inverter,
a comparison unit and
a switch-off device,
wherein the comparison unit is configured to compare the actual rotational speed can be compared with a predeterminable desired rotational speed,
wherein the comparison unit is configured to generate a corresponding signal in the event of the actual rotational speed exceeding the desired rotational speed and to transmit it to the switch-off device by way of which the drive can be switched off,
and second means for detecting the pulse widths of the pulse width-modulated signals, wherein the first means comprises a first microcontroller which is configured to use in a first channel only the pulse width of the pulse width modulated signals for determining the output frequency of the inverter, and in that the first means further comprises a second microcontroller, which is configured to use in a second channel only the pulse width of the pulse width modulated signals for determining the output frequency of the inverter as well, and wherein the first and second channels do not include any voltage measurement and the first and second channels do not include any current measurement.

\* \* \* \* \*